(12) United States Patent
Kim et al.

(10) Patent No.: US 7,616,865 B2
(45) Date of Patent: Nov. 10, 2009

(54) RECORDING MEDIUM HAVING A DATA STRUCTURE FOR MANAGING REPRODUCTION OF SUBTITLE DATA AND METHODS AND APPARATUSES OF RECORDING AND REPRODUCING

(75) Inventors: Hyung Sun Kim, Seoul (KR); Jeong Hye Yang, Jejoo-si (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 513 days.

(21) Appl. No.: 10/832,271

(22) Filed: Apr. 27, 2004

(65) Prior Publication Data

US 2004/0218907 A1 Nov. 4, 2004

(30) Foreign Application Priority Data

Apr. 30, 2003 (KR) .................. 10-2003-027830

(51) Int. Cl.
*H04N 5/91* (2006.01)
*H04N 7/00* (2006.01)

(52) U.S. Cl. .................. 386/95; 386/83; 386/125

(58) Field of Classification Search ............. 386/83, 386/95, 125
See application file for complete search history.

(56) References Cited

U.S. PATENT DOCUMENTS

| | | | |
|---|---|---|---|
| 4,439,759 A | 3/1984 | Fleming et al. | |
| 5,539,716 A | 7/1996 | Furuhashi | |
| 5,636,631 A | 6/1997 | Waitz et al. | |
| 5,748,256 A * | 5/1998 | Tsukagoshi | 348/589 |
| 5,758,007 A * | 5/1998 | Kitamura et al. | 386/45 |
| 5,841,447 A | 11/1998 | Drews | |
| 5,862,300 A | 1/1999 | Yagasaki et al. | |
| 5,912,710 A | 6/1999 | Fujimoto | |
| 5,917,830 A | 6/1999 | Chen et al. | |
| 5,923,627 A | 7/1999 | Miwa et al. | |
| 5,929,857 A | 7/1999 | Dinallo et al. | |
| 5,963,704 A | 10/1999 | Mimura et al. | |
| 5,999,160 A | 12/1999 | Kitamura et al. | |
| 6,009,234 A | 12/1999 | Taira et al. | |
| 6,035,055 A | 3/2000 | Wang et al. | |

(Continued)

FOREIGN PATENT DOCUMENTS

CN 1151586 6/1997

(Continued)

OTHER PUBLICATIONS

Taiwanese Search Report dated Jun. 6, 2007.

(Continued)

*Primary Examiner*—Thai Tran
*Assistant Examiner*—Girumsew Wendmagegn
(74) *Attorney, Agent, or Firm*—Harness, Dickey & Pierce

(57) ABSTRACT

In the data structure for managing reproduction of subtitle data, a subtitle information area of the recording medium includes at least one object data segment and more than one color information segment. The object data segment provides data for reproducing at least a portion of a display object. Each color information segment includes color information and is linked to the object data segment such that during reproduction of the display object only color display attributes of at least a part of the display object change.

24 Claims, 9 Drawing Sheets

U.S. PATENT DOCUMENTS

| | | | |
|---|---|---|---|
| 6,046,778 A | 4/2000 | Nonomura et al. | |
| 6,072,832 A | 6/2000 | Katto | |
| 6,088,507 A | 7/2000 | Yamauchi et al. | |
| 6,112,011 A | 8/2000 | Hisatomi | |
| 6,115,529 A * | 9/2000 | Park | 386/1 |
| 6,134,383 A | 10/2000 | Kikuchi et al. | |
| 6,167,189 A | 12/2000 | Taira et al. | |
| 6,167,192 A | 12/2000 | Heo | |
| 6,204,883 B1 | 3/2001 | Tsukagoshi | |
| 6,226,446 B1 | 5/2001 | Murase et al. | |
| 6,233,393 B1 | 5/2001 | Yanagihara et al. | |
| 6,246,402 B1 | 6/2001 | Setogawa et al. | |
| 6,246,790 B1 | 6/2001 | Huang et al. | |
| 6,286,001 B1 | 9/2001 | Walker et al. | |
| 6,330,210 B1 | 12/2001 | Weirauch et al. | |
| 6,335,742 B1 | 1/2002 | Takemoto | |
| 6,366,732 B1 | 4/2002 | Murase et al. | |
| 6,393,196 B1 | 5/2002 | Yamane et al. | |
| 6,430,311 B1 | 8/2002 | Kumada | |
| 6,433,801 B1 | 8/2002 | Moon et al. | |
| 6,445,877 B1 | 9/2002 | Okada et al. | |
| 6,470,460 B1 | 10/2002 | Kashiwagi et al. | |
| 6,483,983 B1 | 11/2002 | Takahashi et al. | |
| 6,504,996 B1 | 1/2003 | Na et al. | |
| 6,539,166 B2 | 3/2003 | Kawamura et al. | |
| 6,553,180 B1 | 4/2003 | Kikuchi et al. | |
| 6,574,417 B1 | 6/2003 | Lin et al. | |
| 6,707,459 B1 | 3/2004 | Graves et al. | |
| 6,711,287 B1 | 3/2004 | Iwasaki | |
| 6,724,981 B1 | 4/2004 | Park et al. | |
| 6,728,477 B1 | 4/2004 | Watkins | |
| 6,754,435 B2 | 6/2004 | Kim | |
| 6,792,154 B1 | 9/2004 | Stewart | |
| 6,847,777 B1 | 1/2005 | Nakamura | |
| 6,850,228 B1 | 2/2005 | Parks et al. | |
| 6,871,008 B1 | 3/2005 | Pintz et al. | |
| 6,889,001 B1 | 5/2005 | Nikaido et al. | |
| 7,072,401 B2 | 7/2006 | Kim et al. | |
| 7,167,637 B2 | 1/2007 | Mori et al. | |
| 7,236,687 B2 | 6/2007 | Kato et al. | |
| 2001/0036322 A1 | 11/2001 | Bloomfield et al. | |
| 2001/0052127 A1 | 12/2001 | Seo et al. | |
| 2002/0006165 A1 | 1/2002 | Kato | |
| 2002/0006273 A1 | 1/2002 | Seo et al. | |
| 2002/0089516 A1 | 7/2002 | Sobol | |
| 2002/0174430 A1 | 11/2002 | Ellis et al. | |
| 2002/0194618 A1 | 12/2002 | Okada et al. | |
| 2003/0152365 A1 | 8/2003 | Nagayama | |
| 2003/0179900 A1 | 9/2003 | Tian et al. | |
| 2004/0047591 A1 | 3/2004 | Seo et al. | |
| 2005/0045481 A1 | 3/2005 | Astrom | |
| 2006/0045481 A1 | 3/2006 | Yahata et al. | |
| 2006/0064716 A1 | 3/2006 | Sull et al. | |
| 2006/0153535 A1 | 6/2006 | Okada et al. | |
| 2006/0143666 A1 | 7/2006 | Chun et al. | |
| 2006/0165388 A1 | 7/2006 | Uesaka et al. | |
| 2006/1018822 | 8/2006 | Ikeda et al. | |
| 2006/0282775 A1 | 12/2006 | Yahata et al. | |
| 2007/0057969 A1 | 3/2007 | McCrossan et al. | |
| 2007/0133948 A1 | 6/2007 | Kikuchi et al. | |

FOREIGN PATENT DOCUMENTS

| | | |
|---|---|---|
| CN | 1156377 A1 | 8/1997 |
| CN | 1167311 | 12/1997 |
| CN | 1177172 | 3/1998 |
| CN | 1242575 | 1/2000 |
| CN | 1251461 | 4/2000 |
| CN | 1103102 A1 | 3/2003 |
| CN | 1745579 A | 3/2006 |
| CN | 101026775 A | 8/2007 |
| EP | 0 677 954 A | 10/1995 |
| EP | 0724264 | 7/1996 |
| EP | 0 725 541 A | 8/1996 |
| EP | 0782338 A2 | 7/1997 |
| EP | 0831647 | 3/1998 |
| EP | 0898279 | 2/1999 |
| EP | 0913822 | 5/1999 |
| EP | 1 021 048 | 7/2000 |
| EP | 1223580 | 7/2002 |
| EP | 1608165 | 12/2005 |
| EP | 1868190 | 12/2007 |
| JP | 6319125 | 11/1994 |
| JP | 8298554 | 11/1996 |
| JP | 8329004 | 12/1996 |
| JP | 8339663 | 12/1996 |
| JP | 10-028273 | 1/1998 |
| JP | 10-210504 | 8/1998 |
| JP | 10-215409 | 8/1998 |
| JP | 11-018048 | 1/1999 |
| JP | 11-185463 | 7/1999 |
| JP | 11-234622 | 8/1999 |
| JP | 11-298860 | 10/1999 |
| JP | 2000-083216 | 3/2000 |
| JP | 2000-100073 | 4/2000 |
| JP | 2000-132953 | 5/2000 |
| JP | 2000-165361 | 6/2000 |
| JP | 2000-222861 | 8/2000 |
| JP | 2000-261802 | 9/2000 |
| JP | 2001-184839 | 7/2001 |
| JP | 2001-312880 | 11/2001 |
| JP | 2002-056651 | 2/2002 |
| JP | 2002-67533 | 3/2002 |
| JP | 2002-153684 | 5/2002 |
| JP | 2002-344805 | 11/2002 |
| JP | 2003-009096 | 1/2003 |
| KR | 1994-0016014 | 3/1997 |
| KR | 1996-0025645 | 8/1997 |
| KR | 2001-0111247 | 12/2001 |
| KR | 2002-0064463 | 8/2002 |
| RU | 2129758 | 4/1999 |
| WO | WO 00/030357 | 5/2000 |
| WO | WO 00/030358 | 5/2000 |
| WO | WO 00/031980 | 6/2000 |
| WO | WO 00/36600 | 6/2000 |
| WO | WO 00/060598 | 10/2000 |
| WO | WO 2004/098183 | 11/2004 |
| WO | WO 2004/114658 | 12/2004 |
| WO | WO 2005/002220 | 1/2005 |
| WO | WO 2005/052941 | 6/2005 |
| WO | WO 2005/078727 | 8/2005 |

OTHER PUBLICATIONS

Chinese Search Report dated Apr. 6, 2007.
Office Action for corresponding Russian application dated May 5, 2008.
"Digital Video Broadcasting (DVB); Subtitling systems", Final Draft ETSI EN 300 743 V1.2.1 (Jun. 2006), ETSI, Jun. 2002.
Office Action for Chinese Application No. 200480011754.1 dated Feb. 27, 2009 and English translation thereof.
Peter A. Sarginson; "MPEG-2: A Tutorial Introduction to the Systems Layers"; Jan. 1, 1995; pp. 4/1-413, XP006529329.
"Digital Video Broadcasting (DVB); Subtitling systems; Final draft ETSI EN 300 743"; ETSI Standards, LIS, Sophia Antipolis Cedex, France, vol. BC, No. V1.2.1, Jun. 1, 2002; XP014001876; ISSN 0000-0001.
European Search Report dated Sep. 1, 2008 — 04737126.5 -2223/ 1642284.
European Search Report dated Sep. 1, 2008 — 04748368.0 — 2223-.
Chinese Office Action dated Aug. 1, 2008 — Application No. 200480018833.5.
Chinese Office Action dated Aug. 1, 2008 corresponding to Chinese Application No. 200480018832.0.

Office Action for Japanese Application No. 2004-541315 dated Feb. 17, 2009.
Notice of Allowance for corresponding Russian Application No. 2005132412/28(036320) dated Feb. 27, 2009 and English translation thereof.
Office Action for corresponding Chinese Application No. 200710142513.6 dated Apr. 10, 2009 and English translation thereof.

Search Report dated May 26, 2009 for corresponding European Application No. EP 03 79 9199.
Japanese Office Action dated Jun. 23, 2009 corresponding to Application No. 2004-541314.

* cited by examiner

Page Structure

FIG. 3

Page Compostion Segment Syntax

```
extended_page_composition_segment ( ) {
    sync_byte
    segmet_type
    page_id
    segment_length
    page_time_out
    page_version_number
    if (processed_length < segment_length) {
        CLUT_id
        object_id
        object_type
        object_provider_flag
        object_cropping_flag
        object_horizontal_position
        object_vertical_position
        if (object_cropping_flag) {
            object_horizontal_cropping
            object_verticall_cropping
            object_cropping_width
            object_cropping_height
        }
    }
}
```

FIG. 4

Object Data Segment Syntax

```
extended_object_data_segment ( ) {
    sync_byte
    segmet_type
    page_id
    segment_length
    last_in_sequence
    reserved
    object_data ( ) {
        object_id
        object_version_number
        object_coding_method
        reserved
        if (object_coding_method =='00') {
            top_field_data_block_length
            bottom_field_data_block_length
            while(processed_lengh<top_field_data_block_length)
                pixel-data_sub-block( )
            while(processed_lengh<bottom_field_data_block_length)
                pixel-data_sub-block( )
            if (!wordalinged ( ))
                8_stuff_bits
        }
        if (object_coding_method = = ' 01') {
            number of codes
            for (! == 1, i <= number of codes, i ++)
                character_codes
        }
    }
}
```

FIG. 5

CLUT_Definition Segment Syntax

```
CLUT_definition_segment () {
        sync_byte
        segmet_type
        page_id
        segment_length
        CLUT_id
        CLUT_version_number
        while (processed_length < segment_length) {
                CLUT_entry_id
                Y-value
                Cr-value
                Cb-value
                T-value
                }
        }
}
```

FIG. 9
BMP Object Value ( ex : We do Karaoke )
```
FFFFFFFFFFFFFFFFFFFFFFFFFFFFFFFFFFFFFFFFFFFFFFFFFFFF
FFFFFF 00 00 00 FFFFFF 01 01 01 FFFFFFFF 02 02 02 02 02 02 02 02 02 02 FFFFFFFF
FFFFFF 00 00 00 FFFFFF 01 01 01 FFFFFFFF 02 02 02 02 02 02 02 02 02 02 FFFFFFFF
FFFFFF 00 00 00 FFFFFF 01 01 01 FFFFFFFF 02 02 02 02 02 02 02 02 02 02 FFFFFFFF
FFFFFFFFFFFFFFFFFFFFFFFFFFFFFFFFFFFFFFFFFFFFFFFFFFFF
```
We = 00
do = 01
Karaoke = 02
Object 1 (Page 1/ 2/ 3)
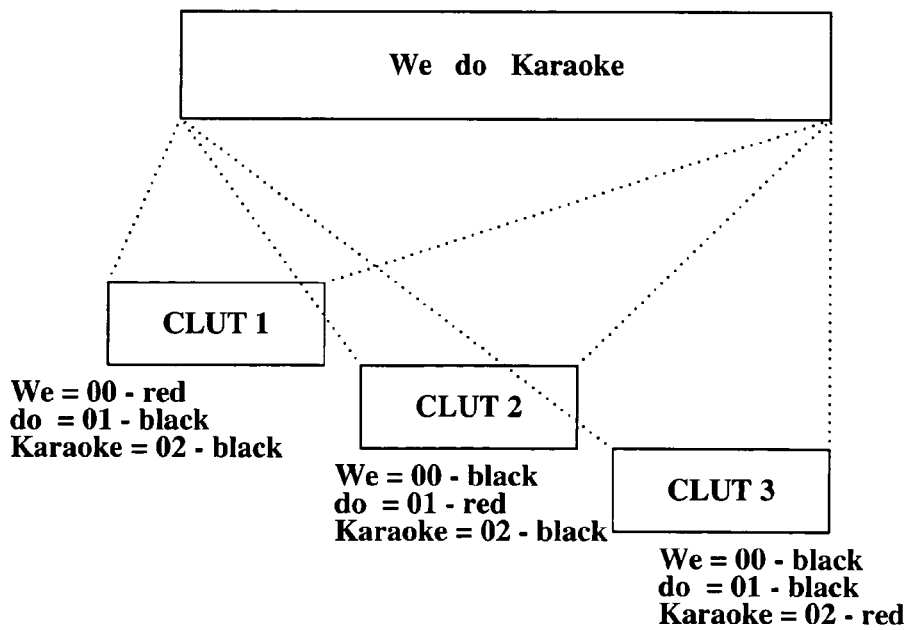

RECORDING MEDIUM HAVING A DATA STRUCTURE FOR MANAGING REPRODUCTION OF SUBTITLE DATA AND METHODS AND APPARATUSES OF RECORDING AND REPRODUCING

FOREIGN PRIORITY

The present invention claims priority under 35 U.S.C. 119 on Korean Application No. 10-2003-027830 filed Apr. 30, 2003; the contents of which are incorporated by reference in their entirety.

BACKGROUND OF THE INVENTION

1. Field of the Invention

The present invention relates a method for managing and reproducing subtitle data of a high-density optical disc.

2. Description of the Related Art

Recently, optical discs like DVDs (Digital Versatile Discs) as well as optical disc apparatuses like DVD recorders and DVD players for recording and reproducing data to and from such optical discs have been actively developed and commercialized. These optical discs are capable of storing large amounts of high-resolution video data and high-fidelity audio data.

Generally, a DVD stores main video data and graphic or text data sometimes generically referred to as subtitle data. Subtitle data is often thought of as text or caption data that may be represented as a bit-map image. However, because this type of subtitle data is image data, some standards such as ETSI EN 300 743 V1.2.1 of the European Video Broadcasting Standard define subtitle data as textual and/or graphical information to provide subtitle or graphs. In this disclosure, the term graphic data or graphic information will be used interchangeably with the term subtitle data to refer to textual and/or graphical information. In a DVD, the subtitle data, such as captions or a logo, is recorded in a format of image data and is synthesized with the main video data when reproduced. In other words, when reproducing the DVD, an optical disc reproduction apparatus like a DVD player reads the subtitle image data together with the main video data from the DVD and outputs them to an external display device like a television receiver so as to produce and display a synthesized picture.

Accordingly, a user can see the reproduced main video data, like picture images, and the subtitle data, like captions or a logo, at the same time via the external display device.

More recently, a high-density optical disc like a BD-ROM having a higher recording density than a conventional DVD has been proposed, and debates on the standardization of such a newly proposed high-density optical disc are taking place in the industry. For example, a method for recording and managing graphic or subtitle data of a BD-ROM in a format of image data, like bit map (BMP) data, and reproduction control information thereof has been recommended.

However, there has not yet been provided an adequate data structure or methods for managing the reproduction of the subtitle image data recorded on a BD-ROM. In order to expedite commercialization of a newly proposed high-density optical disc like a BD-ROM, not only a recording medium data structure and method for recording the data structure, but also an effective method for reproducing the subtitle data are required.

SUMMARY OF THE INVENTION

According to one embodiment of the present invention, a recording medium according to the present invention includes a data structure for managing reproduction of subtitle data.

In one embodiment, the recording medium includes a subtitle information area storing at least one object data segment and more than one color information segment. The object data segment provides data for reproducing at least a portion of a display object. Each color information segment includes color information and is linked to the object data segment such that during reproduction of the display object only color display attributes of at least a part of the display object change. For example, a color display attribute that changes may be luminance, chrominance, transparency, etc.

According to one embodiment, the subtitle information area further includes one or more display information segments linking each color information segment to the object data segment such that during reproduction of the display object only color display attributes of at least a part of the display object change. For example, the display information segments link each color information segment to the object data segment such that when a change between the display information segments used to manage reproduction occurs, only color display attributes of at least a part of the display object change.

Another exemplary embodiment of the present invention provides a method of recording a data structure on a recording medium for managing reproduction of subtitle data. In this method, display control information linking data representing a display object to more than one color information segment is recorded on the recording medium. Each color information segment provides color display information such that during reproduction, color attributes of the display object change without changes in the data representing the display object.

Yet another exemplary embodiment of the present invention provides a method of reproducing subtitle data from a recording medium. In this embodiment, a display object is reproduced such that color attributes of the display object change without changes in the data representing the display object based on different segments of color information reproduced from the recording medium that are linked to the display object.

The present invention further provides apparatuses and additional methods for recording and reproducing the data structure according to the present invention.

BRIEF DESCRIPTION OF THE DRAWINGS

The above and other objects, features and other advantages of the present invention will be more clearly understood from the following detailed description taken in conjunction with the accompanying drawings, in which:

FIG. 3 illustrates an example embodiment of the data structure of a page composition segment recorded on the high-density recording medium according to the present invention;

FIG. 4 illustrates an example embodiment of the data structure of an object data segment recorded on the high-density recording medium according to the present invention;

FIG. 5 illustrates an example embodiment of the data structure for a color lookup table definition segment recorded on a high-density recording medium according to the present invention;

FIG. 9 illustrates an exemplary embodiment of the karaoke text displayed according to an embodiment of the subtitle reproducing method of the present invention.

DETAILED DESCRIPTION OF THE PREFERRED EMBODIMENT

A high-density recording medium such as a BD-ROM can store image data of a format like a bit map (BMP) format as subtitle data (e.g., captions or a logo). In this disclosure, the term graphic data or graphic information will be used interchangeably with the term subtitle data to refer to textual and/or graphical information. In a BD-ROM, the subtitle data, such as captions or a logo, is recorded in a format of image data and is synthesized with the main video data when reproduced. In other words, when reproducing the BD-ROM, an optical disc reproduction apparatus like a optical disk player reads the subtitle image data together with the main video data from the BD-ROM and outputs them to an external display device like a television receiver so as to produce and display a synthesized picture.

Figure 1:
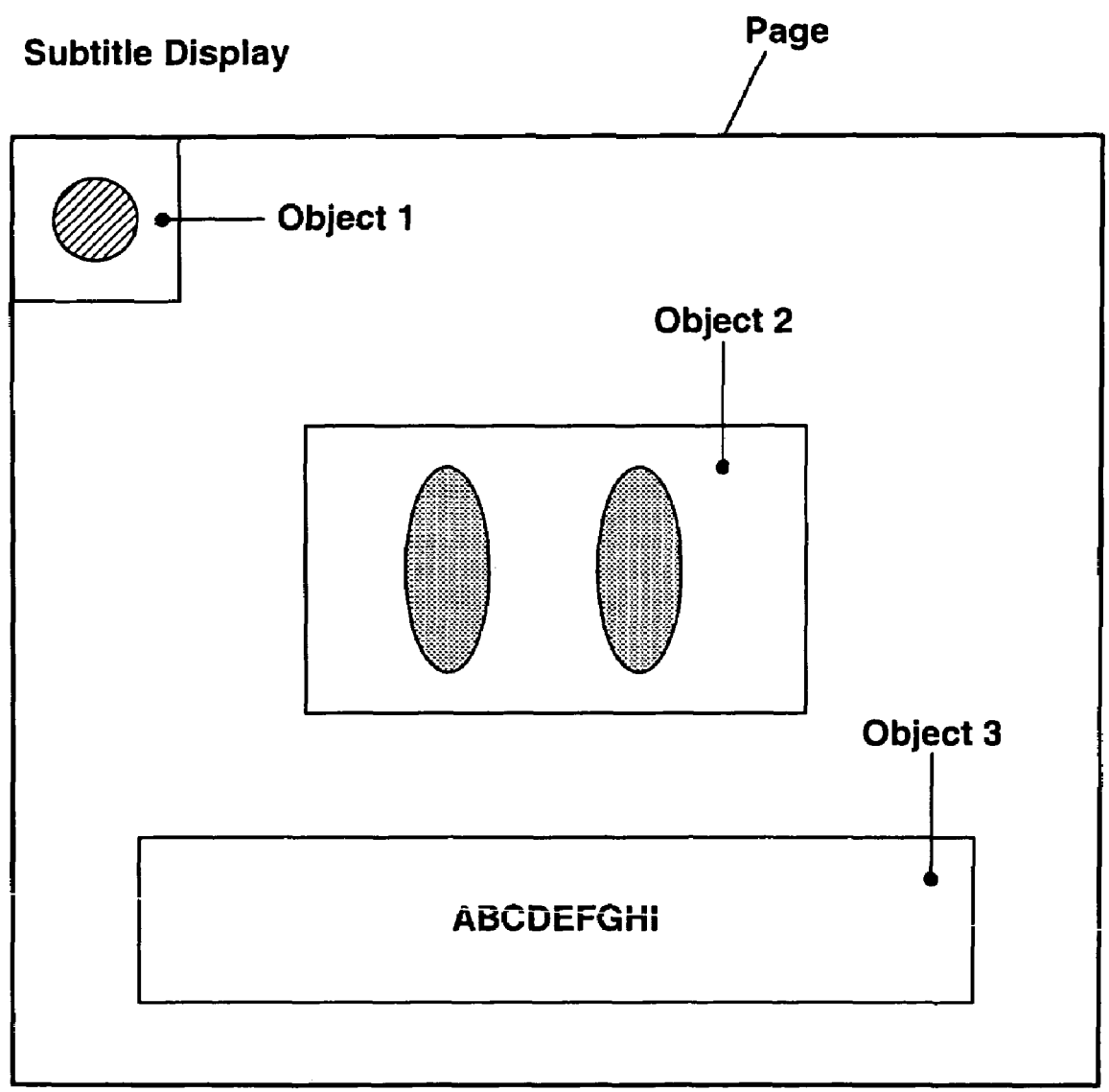
FIG. 1 illustrates an example of a screen, in which a plurality of objects of subtitle data are displayed in a single page according to an embodiment of the present invention.

FIG. 1 illustrates an example of a screen, in which a plurality of objects of graphic data also called subtitle data are displayed in a single page according to an embodiment of the present invention. As shown, various types of image data or subtitle data, such as caption or logo data of a BMP format, may be reproduced and displayed in the same display screen (i.e. in the same single page) as different objects. For example, FIG. 1 shows object 1, object 2, and object 3. As will be described in detail below, each of the objects and the page are recorded and managed as a hierarchical page structure so that a plurality of objects can be included and managed in a single page.

Figure 2:
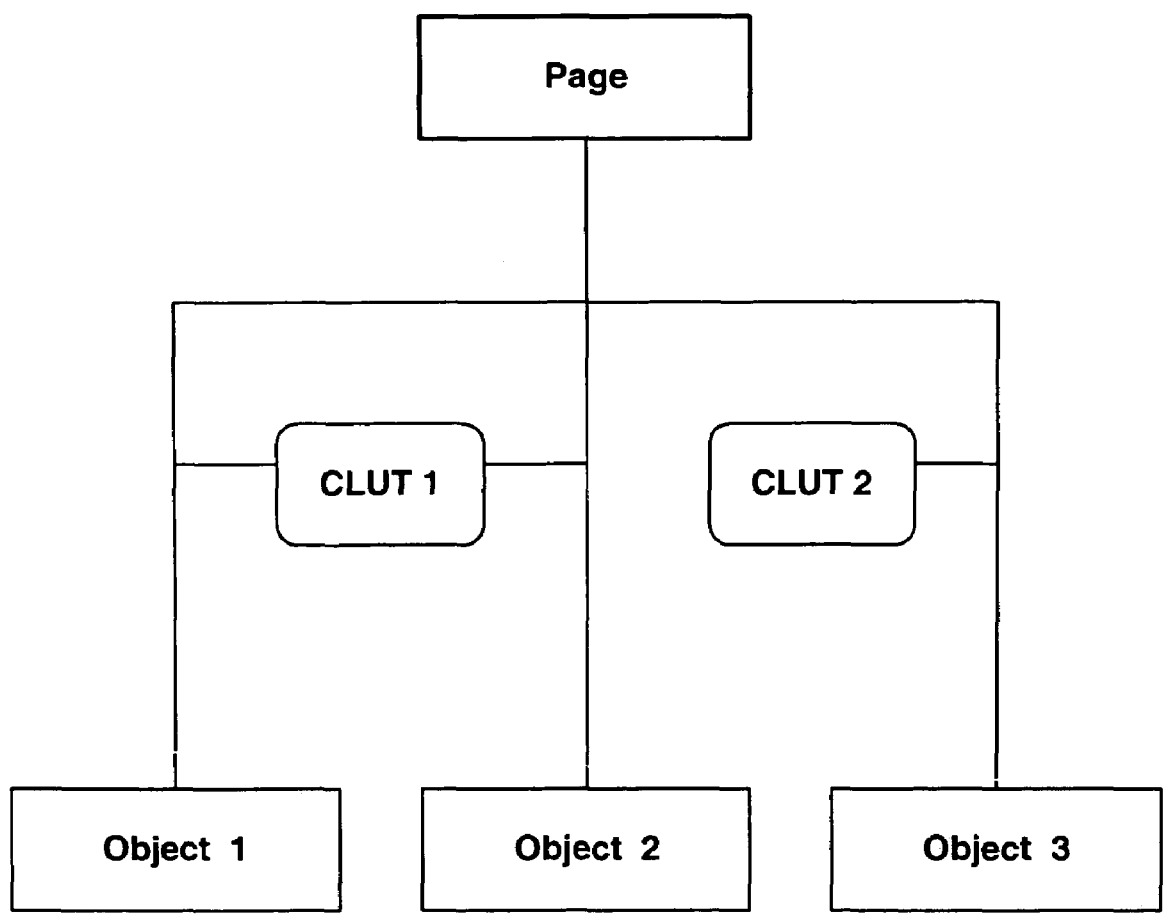
FIG. 2 illustrates a hierarchical page structure according to one example embodiment of the present invention.

FIG. 2 illustrates a hierarchical page structure according to one example embodiment of the present invention. As shown, the objects are managed as a single page. The page structure further includes and manages color lookup tables CLUT 1 and CLUT 2 for controlling reproduction of color, brightness, and transparency of each object image. Each of the color lookup tables may be linked to only one object image or to a plurality of object images. Further, a global color lookup table commonly linked to a plurality of pages may be used.

The object images and reproduction control information thereof may be separately recorded in and managed by a page composition segment (PCS), an object data segment (ODS), and a color lookup table definition segment (CDS), as shown in FIGS. 3 to 5, respectively, and described in detail below.

FIG. 3 illustrates an example embodiment of the data structure of a page composition segment recorded on the high-density recording medium according to the present invention.

As shown, the page composition segment may include information regarding a sync byte, a segment type, page identification (ID), a segment length, page time out, and a page version number. The sync byte is a well-known field containing a value used to verify synchronization. The segment type information indicates that the corresponding segment is a page composition segment, and the page ID information indicates that the corresponding page is a subtitle page. For example, the page ID may indicate the subtitle page serves a particular language like Korean or English. The segment length indicates the length of the segment following the page version number field. The page time out information is the information for deleting buffering data of the corresponding page from a buffer. The page version number indicates the version of this PCS.

The page composition segment may further include information regarding color lookup table (CLUT) ID, object ID, an object type, an object provider flag, an object cropping flag, and object horizontal/vertical positions.

The CLUT ID identifies a family of CLUTs associated with this PCS. The object ID identifies an object to be shown on the page (i.e., display screen). The object type indicates the type (e.g., bitmap, character, character string, etc.) of the object. The object provider flag indicates how the object identified by the object ID is provided; for example, provided in a subtitle data stream. The object cropping flag indicates whether the PCS includes cropping information for defining an area cropping the object identified by the object ID. For example, in a case where the object cropping flag information is set as '1', the object cropping flag information may include object horizontal/vertical cropping data and object cropping width/height data. The object horizontal/vertical cropping data and the object cropping width/length data are recorded for partially displaying an object image. Specifically, the object horizontal/vertical cropping information specify the position of a cropping rectangle (the cropping area) having the dimensions provided by the object cropping width/length. Only that much of the object lying within the cropping rectangle will be displayed.

The PCS also includes object horizontal/vertical position information, which indicates the position of the object identified by the object ID on the display screen.

Next, an example embodiment of the data structure of the object data segment will be described with respect to FIG. 4. As shown in FIG. 4, the object data segment may include information regarding a sync byte, a segment type, page ID, a segment length, and a last-in sequence. The sync byte provides a value used to verify synchronization. The segment type information indicates that the segment is an object data segment and the page ID information indicates the page to which the corresponding segment belongs. The segment length indicates the length of the segment following the last-in sequence field. The last-in sequence information indicates whether this is a last ODS needed to reproduce the graphic image object for which the ODS provides object data. As will be appreciated, it may take more than one ODS's worth of object data to form the object.

Further, the object data segment may include information regarding object ID, an object version number, and an object coding method. The object ID identifies the object. This object ID will be the same as the object ID in the PCS managing display of the identified object. The object version number indicates the version of the object data in this ODS. The object coding method indicates the method by which the object was coded as image data (e.g., bitmap pixels, character codes, etc.).

In one example embodiment, when the object coding method is '00', the ODS includes a top field data block length representing the number of top field data of an object, a bottom field data block length representing the number of bottom field data of the object, and pixel data sub block representing run length coded top field data and bottom field data of the object. In another example embodiment, the object data is a character code, the object coding method is recorded as '01' and the number of codes and the respective character codes are recorded.

FIG. 5 illustrates an example embodiment of the data structure for a color lookup table definition segment recorded on a high-density recording medium according to the present invention. As shown, the color lookup table definition segment (CDS) may include information regarding a sync byte, a segment type, page ID, a segment length, color lookup table (CLUT) ID, and a color lookup table (CLUT) version number. The sync byte provides a value used to verify synchronization. The segment type information indicates that the segment is a color lookup table definition segment and the page ID information indicates the page to which the corresponding segment belongs. The segment length indicates the length of the segment following the CLUT version number field. The CLUT ID information indicates a family of CLUTs to which the CDS belongs. As will be described in detail below, the CDS provides a single color definition. The family of CLUTs provides a color palette from which to select color definitions. The CLUT version number indicates the version of this CDS.

The color lookup table definition segment may further include information regarding color lookup table entry ID, a brightness value (Y-value), a red color value (Cr-value), a blue color value (Cb-value), and a transparency value (T-value). Accordingly, when linked to an object by a PCS, these values control color attributes of the displayed object such as luminance or brightness, chrominance (Cr and Cb) and transparency. The CLUT entry ID identifies the entry of this CDS in the family of CLUTs (identified by the CLUT ID) to which this CDS belongs.

Figure 6:
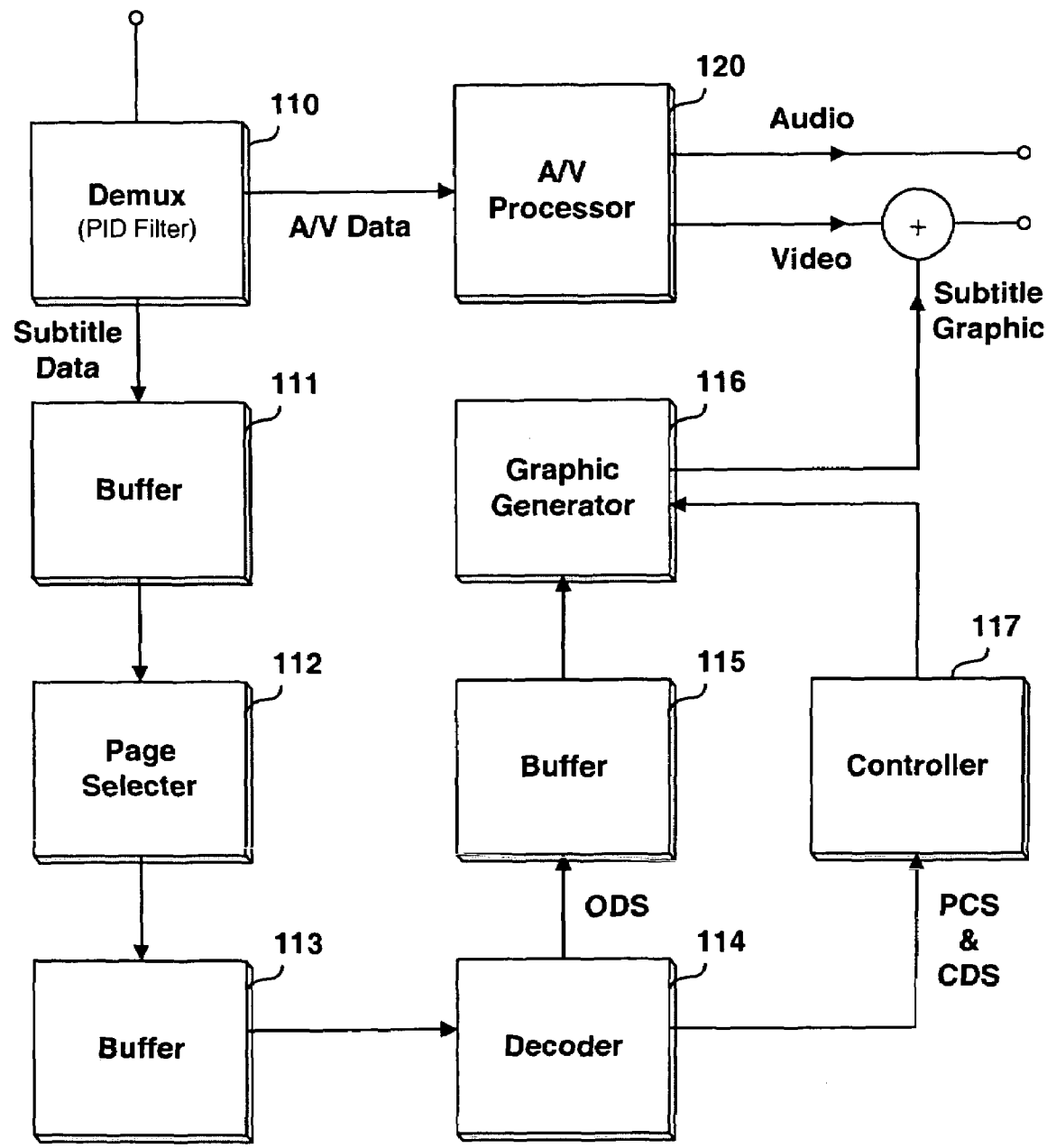
FIG. 6 illustrates an embodiment of an optical disc apparatus to which a method for reproducing subtitle data of a high-density optical disc according to the present invention is applicable.

FIG. 6 illustrates an embodiment of an optical disc apparatus to which a method for reproducing subtitle data of a high-density optical disc according to the present invention is applicable. As shown in FIG. 6, the optical disc apparatus includes a demultiplexer (DEMUX) 110, buffers 111, 113, and 115, a page selector 112, a decoder 114, a graphic generator 116, a controller 117, and an A/V processor 120.

The DEMUX 110 separates subtitle or graphic data and A/V data from a data stream, such as a transport stream, read from an optical disc with reference to packet ID (PID) information. The A/V processor 120 performs a series of processes, such as decoding the separated A/V data and outputting the decoded audio and video signals.

The separated subtitle data is temporarily stored in the buffer 111 and is provided to the page selector 112. The page selector 112 selectively outputs particular subtitle data, i.e., the page composition segment (PCS), the object data segment (ODS), and the color look table definition segment (CDS). When the page ID information corresponds to the caption or logo data, for example, of a particular language a user will have selected, this selection will have been provided to the page selector 112. The page selector 112 selects the PCS, ODS, and CDS having the page ID matching the user's selection.

The selected page composition segment (PCS), the object data segment (ODS), and the color lookup table definition segment (CDS) are temporarily stored in the buffer 113 and are then provided to the decoder 114. The decoder 114 performs a series of decoding processes for decoding the segments. At this time, the image data included in the object data segment (ODS) is temporarily stored in the buffer 115, and is then provided to the graphic generator 116.

On the other hand, the reproduction control information included in the page composition segment (PCS) and the color lookup table definition segment (CDS) are provided to the controller 117. The controller 117 performs a series of control processes for controlling operations of the graphic generator 116 with reference to the reproduction control information.

Accordingly, the graphic generator 116 produces and outputs graphic images of the subtitle corresponding to the reproduction control information included in the page composition segment (PCS) and the color lookup table definition segment (CDS). As shown, the graphic image of the subtitle is displayed as a subtitle image together with main video image reproduced via the A/V processor 120.

Figure 7:
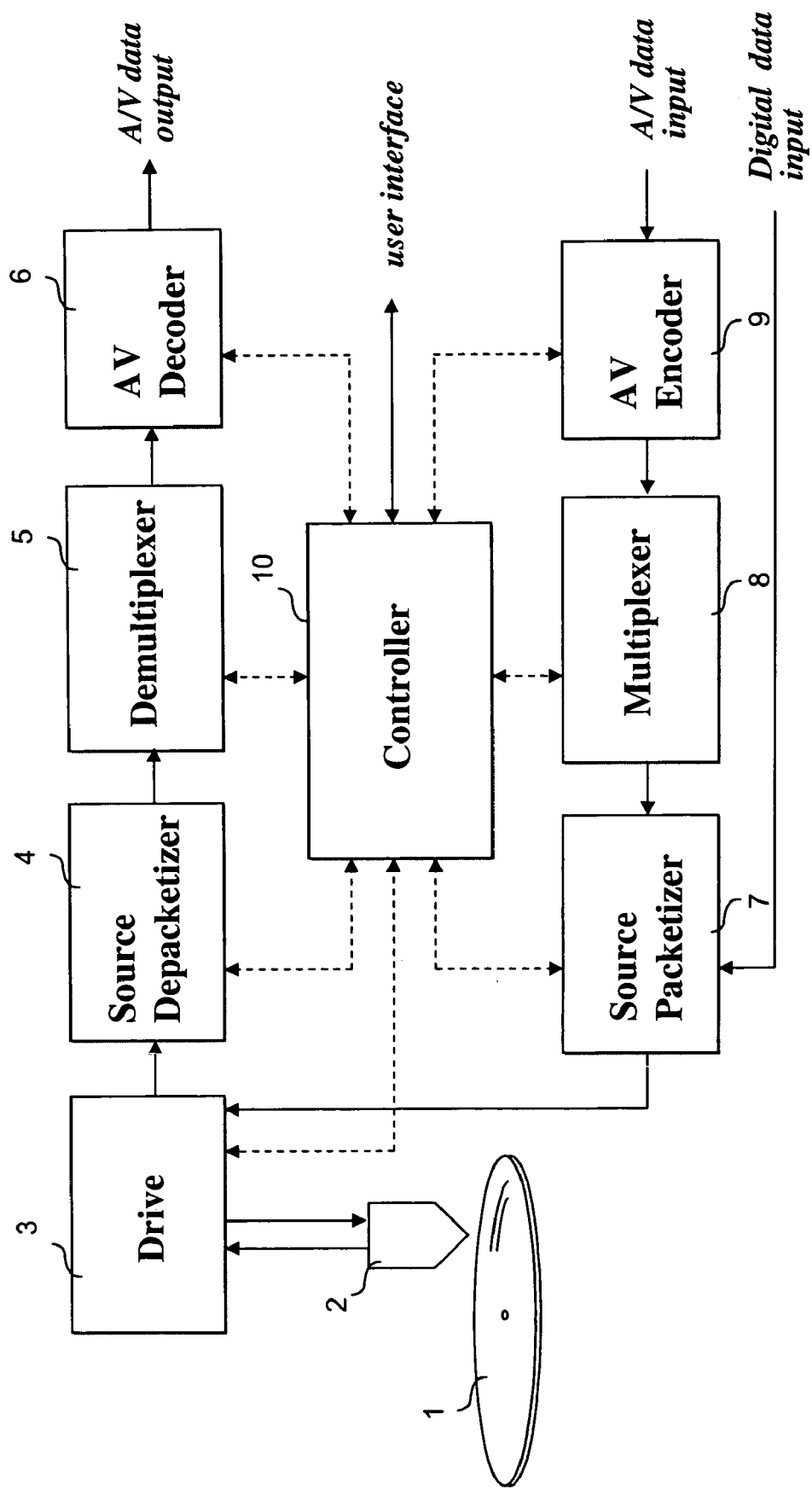
FIG. 7 illustrates a schematic diagram of an embodiment of an optical disk recording and reproducing apparatus according to the present invention.

FIG. 7 illustrates a schematic diagram of an embodiment of an optical disk recording and reproducing apparatus according to the present invention. As shown, an AV encoder 9 receives and encodes data (e.g., still image data, audio data, subtitle data etc.). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 7, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

For example, based on information received via the user interface (e.g., instruction set saved on disk, provided over an intranet or internet by a computer system, etc.) the controller 10 controls the drive 3 to record one or more of the data structures of FIGS. 3-5 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk.

The reproduced source packets are received by a source depacketizer 4 and converted into a data stream (e.g., an MPEG-2 transport packet stream). A demultiplexer 5 demultiplexes the data stream into encoded data. An AV decoder 6 decodes the encoded data to produce the original data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format. As will be appreciated, the logical blocks of this embodiment may be structured in accordance with the physical structure described in detail with respect to FIG. 6.

While FIG. 7 has been described as a recording and reproducing apparatus, it will be understood that only a recording or only a reproducing apparatus may be provided using those portions of FIG. 7 providing the recording or reproducing function.

The data structure for and method for managing subtitle data on a high-density recording medium in accordance with embodiments of the present invention allows effective management of the reproduction of the subtitle data.

In the mean time, a high-density optical disk such as a BD-ROM may store subtitle data such as karaoke text as BMP-formatted image data. While the karaoke text is displayed for a predetermined duration, the color of some characters of the text changes. A method of effectively recording and reproducing the image data of the karaoke text will now be described in detail.

As mentioned above, the method of managing subtitle data for a high-density recording medium in accordance with the present invention may be embodied in an optical disk recording apparatus for authoring high-density read-only disks such as BD-ROMs. The subtitle data of a high-density optical disk is organized as the page composition segment (PCS), the object data segment (ODS), and the color lookup table definition segment (CDS).

The BMP data corresponding to a character of the karaoke text to be displayed for a predetermined duration, i.e., an object image, among the subtitle data, and is linked to a plurality of color lookup tables for display control of the object image.

Figure 8:
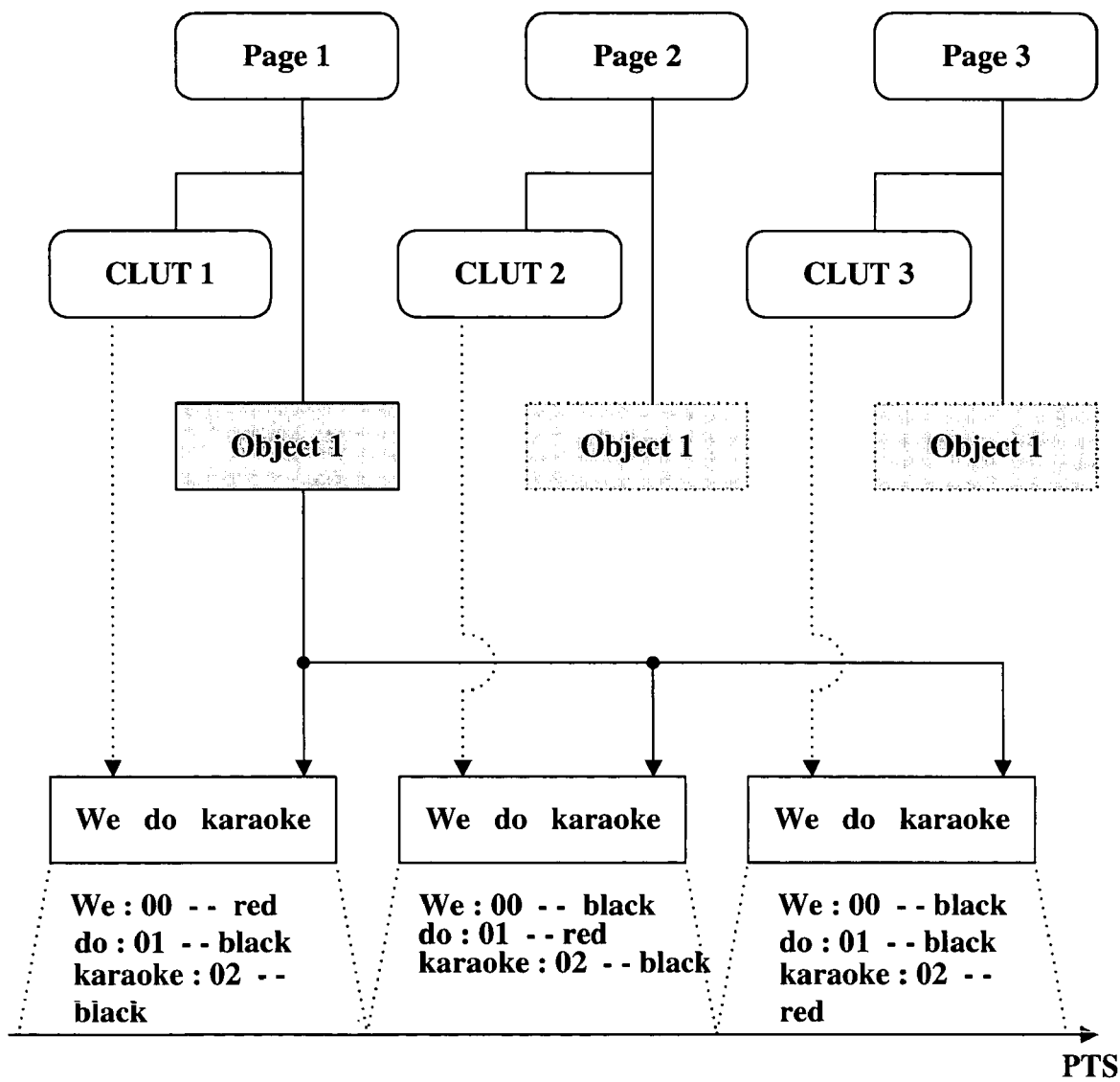
FIG. 8 illustrates an exemplary embodiment of one object and a plurality of associated pages and color lookup tables in accordance with an embodiment of the present invention.

The plurality of color lookup tables may be associated with a plurality of different pages. In FIGS. 8 and 9, object 1 of the karaoke text 'We do karaoke' is associated with color lookup table 1 (CLUT 1) and page 1. Namely, the PCS includes the object ID for object 1 and the CLUT ID for the CLUT 1; thus, linking CLUT 1 with object 1. The color lookup table 1 (CLUT 1) includes color values for displaying the characters ('00') corresponding to 'We' in red, the characters ('01') corresponding to 'do' and the characters ('02') corresponding to 'karaoke' in black.

Color lookup table 2 (CLUT 2) is associated with page 2 in order to gradually change the color of some characters of the text. The page 2 and color lookup table 2 (CLUT 2) are associated with the same object, object 1. Here, the second page (e.g., PCS) links the same object 1 with a different CLUT, CLUT 2. As a result, the color information for the object 1 changes (i.e., the color attributes of the object 1 change) without changing the data of the object. The color lookup table 2 (CLUT 2) includes color values for displaying the characters ('00') corresponding to 'We' in black, the characters ('01') corresponding to 'do' in red, and the characters ('02') corresponding to 'karaoke' in black.

Color lookup table 3 (CLUT 3) is associated with page 3. The page 3 and color lookup table 3 are associated with the same object, object 1. A third PCS links another CLUT, CLUT 3, with the same object 1 to change the color attributes (e.g., luminance, chrominance, transparency, etc.) of the object 1 with changing of the data of object 1. The color lookup table 3 (CLUT 3) includes color values for displaying the characters ('00') corresponding to 'We' and the characters ('01') corresponding to 'do' in black, and the characters ('02') corresponding to 'karaoke' in red.

The optical disk reproducing apparatus described with reference to FIG. 6 outputs the karaoke text 'We do karaoke' of the Object 1, displaying first only the characters corresponding to 'We' in red using the color lookup table 1 and then gradually changing the color of the characters corresponding to 'do' and 'karaoke' from black to red using color lookup tables 2 and 3. The method of the present invention allows karaoke operations that change colors of text characters with only small amounts of BMP data because the BMP data for the object does not change.

The methods and apparatuses for managing and reproducing subtitle data for a high-density recording medium in accordance with the present invention effectively records image data of subtitles (e.g., BMP data) using a simplified hierarchical structure on a high-density recording medium, thereby allowing effective management and reproduction of the subtitle data.

The present invention further provides a recording medium having a data structure for managing the reproduction of subtitle data, and provides methods and apparatuses for recording the data structure on the recording medium.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A recording medium having a data structure for managing reproduction of graphic data, comprising:

an information area storing one or more display information segments, each display information segment including one or more display control information linking at least one color information segment to data representing a display object, each color information segment providing color display information, wherein the display information segments link each color information to the data representing the display object such that when a change between the display information segments used to manage reproduction occurs, only a color display attribute of at least a part of the display object changes.

2. A method of recording a data structure on a recording medium for managing reproduction of graphic data, comprising:

recording, by a recording apparatus, one or more display information segments, each display information segment including one or more display control information linking at least one color information segment to data representing a display object, each color information segment providing color display information, wherein the display information segments link each color information segment to the data representing the display object such that when a change between the display information segments used to manage reproduction occurs, only a color display attribute of at least a part of the display object changes.

3. A method of reproducing graphic data from a recording medium, comprising:

reproducing, by a reproducing apparatus, graphic data management information from the recording medium, the graphic data management information including at least one object data segment and one or more color information segment;

reproducing, by a reproducing apparatus, graphic data representing at least a portion of a display object, the graphic data provided by the object data segment;

applying color attributes to the display object based on color information in one of the color information segments linked to the graphic image object; and changing at least one of the color attributes of the display object without changing the graphic data representing the display object based on another of the color information segments linked to the display object, wherein the graphic information data management information further includes one or more display information segments linking each color information segment to the object data segment, and the display information segments link each color information segment to the object data segment such that when a change between the display information segments used to manage reproduction occurs, the at least one of the color attributes of the display object is changed without changing the graphic data representing the display object.

4. A method of reproducing graphic data from a recording medium, comprising:

reproducing, by a reproducing apparatus, a display object such that color attributes of the display object change without changes in the data representing the display object based on different segments of color information reproduced from the recording medium that are linked to the display object; and reproducing, by a reproducing apparatus, one or more display information segments linking each color information segment to the data representing the display object, wherein the display information segments link each color information segment to the data representing the display object such that when a change between the display Information segments used to manage reproduction occurs, the display object is reproduced such that a color attribute of the display object change without changes in the data representing the display object.

5. A method of recording a data structure for managing reproduction of a graphic data, comprising:

recording, by a recording apparatus, at least one object data segment and one or more color information segment on the recording medium, the object data segment providing data for reproducing at least a portion of a display object, each color Information segment including color information and being linked to the object data segment and recording by a recording apparatus, one or more display information segments on the recording medium linking each color information segment to the object data segment, wherein the display information segments link each color information segment to the object data segment such that when a change between the display information segments used to manage reproduction occurs, only a color display attribute of at least a part of the display object change.

6. A method of reproducing a data structure for managing reproduction of a graphic data, comprising:

reproducing, by a reproducing apparatus, at least one object data segment and one or more color information segments from the recording medium, the object data segment providing data for reproducing at least a portion of a display object, each color information segment Including color information and being linked to the object data segment and reproducing, by a reproducing apparatus, one or more display information segments from the recording medium linking each color information segment to the object data segment, wherein the display information segments link each color information segment to the object data segment such that when a change between the display information segments used to manage reproduction occurs, only a color display attribute of at least a part of the display object changes.

7. An apparatus for recording a data structure for managing reproduction of a graphic data, comprising:

an recording device configured to record data on the recording medium;

a controller configured to control the recording device configured to record at least one object data segment and one or more color information segments on the recording medium, the object data segment providing data for reproducing at least a portion of a display object, each color information segment including color information and being linked to the object data segment the controller configured to control the recording device to record one or more display information segments on the recording medium linking each color information segment to the object data segment, wherein the display information segments link each color information segment to the object data segment such that when a change between the display information segments used to manage reproduction occurs, only color display attributes of at least a part of the display object change.

8. An apparatus for reproducing a data structure for managing reproduction of graphic data, comprising:

a reproducing device configured to reproduce data recorded on the recording medium;

a controller configured to control the reproducing device to reproduce at least one object data segment and one or more color information segments from the recording medium, the object data segment providing data for reproducing at least a portion of a display object, each color Information segment including color information and being linked to the object data segment the controller configured to control the reproducing device to reproduce one or more display information segments from the recording medium linking each color information segment to the object data segment to the object data segment, wherein the display information segments link each color information segment to the object data segment such that when a change between the display information segments used to manage reproduction occurs, only color display attributes of at least a part of the display object change.

9. The recording medium of claim 1, wherein the color display attribute that changes is at least one of luminance, chrominance and transparency.

10. The recording medium of claim 1, wherein each display information segment identifies the display object and a family of color information to which at least one of the color information segments belongs.

11. The method of claim 2, wherein the color display attribute that changes is at least one of luminance, chrominance and transparency.

12. The method of claim 2, wherein each display information segment identifies the display object and a family of color information to which at least one of the color information segments belongs.

13. The method of claim 3, wherein the color display attribute that changes is at least one of luminance, chrominance and transparency.

14. The method of claim 12, wherein each display information segment identifies the display object and a family of color information to which at least one of the color information segments belongs.

15. The method of claim 4, wherein the color display attribute that changes is at least one of luminance, chrominance and transparency.

16. The method of claim 4, wherein each display information segment identifies the display object and a family of color information to which at least one of the color information segments belongs.

17. The method of claim 5, wherein the color display attribute that changes is at least one of luminance, chrominance and transparency.

18. The method of claim 5, wherein each display information segment identifies the display object and a family of color information to which at least one of the color information segments belongs.

19. The method of claim 6, wherein the color display attribute that changes is at least one of luminance, chrominance and transparency.

20. The method of claim 6, wherein each display information segment identifies the display object and a family of color information to which at least one of the color information segments belongs.

21. The apparatus of claim 7, wherein the color display attribute that changes is at least one of luminance, chrominance and transparency.

22. The apparatus of claim 7, wherein each display information segment identifies the display object and a family of color information to which at least one of the color information segments belongs.

23. The apparatus of claim 8, wherein the color display attribute that changes is at least one of luminance, chrominance and transparency.

24. The apparatus of claim 8, wherein the controller controls to reproduce each display information segment, the each display information segment identifying the display object and a family of color information to which at least one of the color information segments belongs.

* * * * *

UNITED STATES PATENT AND TRADEMARK OFFICE
CERTIFICATE OF CORRECTION

PATENT NO. : 7,616,865 B2
APPLICATION NO. : 10/832271
DATED : November 10, 2009
INVENTOR(S) : Hyung Sun Kim et al.

It is certified that error appears in the above-identified patent and that said Letters Patent is hereby corrected as shown below:

Column 10, lines 29-49, Claim 8 should read
8. An apparatus for reproducing a data structure for managing reproduction of a graphic data, comprising:
    a reproducing device configured to reproduce data recorded on the recording medium;
    a controller configured to control the reproducing device to reproduce at least one object data segment and one or more color information segments from the recording medium, the object data segment providing data for reproducing at least a portion of a display object, each color information segment including color information and being linked to the object data segment the controller configured to control the reproducing device to reproduce one or more display information segments from the recording medium linking each color information segment to the object data segment, wherein the display information segments link each color information segment to the object data segment such that when a change between the display information segments used to manage reproduction occurs, only a color display attributes of at least a part of the display object changes.

Signed and Sealed this
Fourteenth Day of June, 2011

David J. Kappos
*Director of the United States Patent and Trademark Office*